(12) United States Patent
Balachandran et al.

(10) Patent No.: US 7,187,715 B2
(45) Date of Patent: Mar. 6, 2007

(54) SYSTEMS AND METHODS FOR PROVIDING ADAPTIVE PULSE POSITION MODULATED CODE DIVISION MULTIPLE ACCESS FOR ULTRA-WIDEBAND COMMUNICATION LINKS

(75) Inventors: Krishna Balachandran, Morganville, NJ (US); Doru Calin, Freehold, NJ (US); Tingfang Ji, Highland Park, NJ (US); Joseph H. Kang, Belle Mead, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 747 days.

(21) Appl. No.: 10/252,351

(22) Filed: Sep. 23, 2002

(65) Prior Publication Data

US 2004/0057501 A1 Mar. 25, 2004

(51) Int. Cl.
*H04B 14/04* (2006.01)
(52) U.S. Cl. .................... 375/242; 375/146; 375/147
(58) Field of Classification Search .............. 375/130, 375/140, 146–147, 239, 242
See application file for complete search history.

(56) References Cited

U.S. PATENT DOCUMENTS 5,610,907 A * 3/1997 Barrett ................ 370/342
5,677,927 A * 10/1997 Fullerton et al. ......... 375/130
6,717,992 B2 * 4/2004 Cowie et al. ............ 375/316
6,959,032 B1 * 10/2005 Richards et al. ......... 375/138

* cited by examiner

*Primary Examiner*—Kevin Burd
*Assistant Examiner*—Freshteh N Aghdam (57) ABSTRACT

An adaptive pulse position modulated CDMA scheme for use in UWB communications systems is disclosed. A stream of input bits is encoded with spreading code sequence. The spreading code sequence consists of a number of code elements that may have one of two values. Each bit is encoded into a symbol consisting of a predefined number of chips, which are transmitted during a symbol period. Next, at least one code element is associated with each chip in the symbol. Then, an encoded pulse is generated in each chip. Each encoded pulse has a value determined by multiplying the data bit with the code value associated with the particular chip. The encoded pulse is then pulse position modulated by shifting the position of the pulse to a first position or a second position within the chip depending upon the encoded value of the pulse.

16 Claims, 5 Drawing Sheets

SYSTEMS AND METHODS FOR PROVIDING ADAPTIVE PULSE POSITION MODULATED CODE DIVISION MULTIPLE ACCESS FOR ULTRA-WIDEBAND COMMUNICATION LINKS

TECHNICAL FIELD OF THE INVENTION

The present invention relates to the field of communications, and more particularly to pulse position modulated code division multiple access (PPM-CDMA) for use in ultra-wideband communications systems.

BACKGROUND

Ultra-wide band (UWB) technology also referred to as impulse, baseband, and zero-carrier technology, uses ultra short pulses, typically less than a nanosecond in duration, to convey information. The ultra short pulse duration means that the signal is spread across a wide bandwidth, which typically exceeds one-quarter of the nominal center frequency. Since the distribution of energy is spread across a wide spectral range, the spectral density is very low.

UWB communications systems have been described as the most promising technology to emerge from the telecommunications industry in recent years. The reason is that UWB technology has several unique features, such as immunity to multi-path interference, immunity to jamming and interference, low probability of detection, low power consumption, and enhanced penetration capability, that make it attractive for use in communications systems. In addition, UWB technology is attractive for communications because the elimination of radio frequency (RF) components in UWB systems allows for the use of transmitters and receivers with relatively low hardware complexity.

Since UWB transmitters emit signals at levels below the noise floor, UWB signals have a low probability of detection and a low probability of interception. While these properties are desirable for covert communications and may cause minimal interference on licensed/unlicensed bands, they make it difficult to demodulate and decode the signal. Fortunately, spread spectrum techniques are well suited to extract UWB signals under these circumstances. In spread spectrum techniques, the frequency components of the signal are "spread" across the frequency spectrum by encoding each bit of information in a symbol consisting of a series of "chips" that are transmitted during a symbol period that is allotted for each bit of information.

Multiple channels may be enabled to operate simultaneously through the use of either Direct Sequence Code Division Multiple Access (DS-CDMA) or Time Hopped Code Division Multiple Access (TH-CDMA) where each channel is assigned a code sequence $c=\{c_1, c_2, \ldots, c_{Nc}\}$. During each symbol period, a sequence of $N_c$ chips is transmitted. Let d denote the duty cycle (i.e., fraction of pulse duration over a chip period). Given a bandwidth W, a DS-CDMA or TH-CDMA system with spreading factor $N_c$ allows symbol rates up to $d*W/N_c$.

One particularly challenging issue for a UWB communications system employing DS-CDMA with antipodal signaling is adequately resolving the polarization of the received signals. There are some applications for which UWB is targeted to operate in harsh environments (e.g. military or emergency rescue). In such environments, the transmitted pulse shape can be severely distorted to the point where polarization resolution becomes particularly challenging.

TH-CDMA signals typically are modulated using pulse position modulation (PPM). TH-CDMA allows for channelization via time-hop sequences and PPM eliminates the need for resolving the polarization of the received signal. However, the number of possible orthogonal time-hop sequences is severely limited. If the number of orthogonal time-hop sequences is not sufficient, a random (or pseudorandom) hopping sequence may be used. However, such sequences do not guarantee orthogonality between channels and the receiver encounters higher multiple access interference. As a result, neither DS-CDMA with antipodal signaling nor TH-CDMA is particularly well suited for UWB operation due to harsh environments and the limited number of orthogonal hopping sequences, respectively.

Thus, there is a need in the art for a modulation scheme that allows for the use of a large number of orthogonal codes, yet operates in harsh environments without the need to resolve polarization.

SUMMARY OF THE INVENTION

The present invention meets the above-described needs by providing a binary PPM protocol for use with a spread spectrum signal in UWB communications systems. Each chip in the spread spectrum signal is modulated using binary PPM such that the polarization of the modulated signal does not need to be resolved. The PPM parameters and chip duration can be selected to avoid/mitigate the effects of signal dispersion and multi-access interference. Generally described, the invention provides a method for modulating a communications signal consisting of a stream of input data bits within a communications system. First, at least one spreading code sequence is generated. The spreading code sequence consists of a number of code elements that may have one of two values. The signal is spread by encoding each bit into a symbol consisting of a predefined number of chips, which are transmitted during a symbol period. Next, at least one code element is associated with each chip in the symbol. Then, an encoded pulse is generated in each chip. Each encoded pulse has a value determined by multiplying the data bit with the code value associated with the particular chip. Lastly, the encoded pulse is pulse position modulated by shifting the position of the pulse within the chip depending upon the encoded value of the pulse.

More particularly described, the encoded pulse is modulated by shifting the pulse to a first position within a particular chip if the value of the encoded pulse is a first value. However, if the value of the encoded pulse is a second value the encoded pulse is shifted to a second position. More specifically, the value of the encoded pulse may be either −1 or +1. Therefore, if the value of the encoded pulse is −1, the pulse is placed in the first position, which is shifted forward in time relative to the unmodulated position by an amount equal to $\Delta_p$. Ranging in value from zero to one-half of the chip duration minus the pulse duration, $\Delta_p$ is a fixed shift value that determines the location of the pulse within the chip particularly when the pulse duration is much smaller than the chip duration. If the value of the encoded pulse is +1, the pulse is shifted to a second position forward in time relative to the first position by an amount equal to $\tau_p$, the PPM modulator time shift.

The various aspects of the present invention may be more clearly understood and appreciated from a review of the following detailed description of the disclosed embodiments and by reference to the appended drawings and claims.

DETAILED DESCRIPTION OF THE EMBODIMENTS

The present invention is a modulation protocol for an ultra-wideband (UWB) data signal. Each chip within a spread spectrum signal is modulated using binary pulse position modulation (PPM) so that the polarization of the modulated signal does not need to be resolved. In an exemplary embodiment, the signal transmitted during the $n^{th}$ symbol interval is given by the equation:

$$s_b(t) = \sum_{i=0}^{N_c-1} p(t - iT_c - \Delta_p - (1 - bc_i)\tau_p/2), (n-1)T_s < t < nT_s, \quad (1)$$

where b is the information bit and takes on the value {−1, +1}, $c_i$ is the spreading code for the individual chips and has the value $c_i$={−1, +1}, $T_s$ is the symbol period, $T_c$ is the chip period, $\tau_p$ is the shift of the PPM modulator, and $\Delta_p$ is a fixed shift of the pulse within each sub-chip window. Ranging in value from zero to one-half of the chip duration minus the pulse duration, $\Delta_p$ is a fixed shift that determines the location of the pulse within the chip. In the exemplary embodiment, $\tau_p$ is equal to one-half of the chip period, $\Delta_p$ is zero, and p(x) is the transmitted monocycle waveform that nominally begins at time zero on the transmitter's clock with a duration less than or equal to $\tau_p$.

The PPM-CDMA scheme of the preferred embodiment provides more robust performance than the conventional DS-CDMA modulation scheme. First, PPM-CDMA is less susceptible to channel distortion since the receiver does not need to resolve the polarization of the received signal. Secondly, the performance of the PPM-CDMA protocol can be easily adapted to the quality of the individual channels. Since the modulation is a function of the time shift $\tau_p$, between the modulated pulses, a variable time shift may be used to correct any variability in the channel dispersion.

The PPM-CDMA scheme of the exemplary embodiment also offers several advantages over the conventional TH-CDMA protocol. First, the PPM-CDMA modulation scheme can accommodate a greater number of orthogonal channels as compared to TH-CDMA. In the absence of delay spread, if orthogonal channels are used, the TH-CDMA modulation scheme can accommodate a number of non-interfering users given by the formula:

$$NI_{TH} = T_c/T_p$$

where $NI_{TH}$ is the number of non-interfering users under the TH-CDMA protocol, $T_c$ is the chip period and $T_p$ is the pulse duration. However, the PPM-CDMA protocol can accommodate a number of non-interfering users given by the formula:

$$NI_{PPM} = T_s/T_c$$

where $NI_{PPM}$ is the number of users under the PPM-CDMA modulation scheme, $T_s$ is the symbol period, and $T_c$ is the chip period. $NI_{PPM}$ is merely the number of chips transmitted during the symbol period. As an example, suppose the symbol period is $10^{-10}$ seconds, the chip period is $1.25 \times 10^{-11}$ and the pulse width is $5 \times 10^{-12}$ seconds. In the conventional TH-CDMA system, the number of non interfering users would be 2.5 or 2 users. On the other hand, the number on non-interfering users in the PPM-CDMA would be 8. Therefore, the PPM-CDMA protocol would be able to accommodate up to four times as many non-interfering users as the TH-CDMA protocol.

When designing a UWB communications system using PPM-CDMA, several constraints must be considered, such as inter-symbol interference and inter-chip interference. The delay spread, $T_D$, determines the degree of inter-symbol and inter-chip interference, if any, that the receiver experiences. If the delay spread becomes too great, then the ability of the receiver to resolve individual pulses is diminished and inter-chip or inter-symbol interference may occur. Specifically, if the symbol period, $T_s$ of the signal is less than the delay spread, then inter-symbol interference may occur. Similarly, if the chip period, $T_c$, is less than the delay spread, $T_D$, then inter-chip interference will occur. Unfortunately, in UWB communications systems, the delay spread, $T_D$, is typically greater than the chip period, Tc, which results in inter-chip interference. In the presence of inter-chip interference, the demodulator in the receiver requires a RAKE receiver to resolve the multipath components of the spread spectrum signal. However, RAKE receivers are impractical to implement in a UWB communications system because there may be typically anywhere from tens to hundreds of paths having comparable signal strength. Therefore, since implementing RAKE receivers in UWB communications systems is impractical, the chip period, $T_c$, in the exemplary embodiment, is greater than the delay spread, $T_D$, of the system. This insures that there will be no inter-chip or inter-symbol interference and each pulse can be adequately resolved.

To increase the efficiency of the UWB system, the symbol period, chip period, and PPM time shift may be adapted to allow an operator to achieve higher rates and increased robustness. For example, if the channel conditions are good, reducing the symbol period, $T_s$, allows higher data rates to be achieved. Additionally, if the channel conditions are good (i.e., very little propagation loss), and an energy detector is used as the UWB receiver, then the pulse spacing may be reduced during times when the channel conditions are good (i.e., very little energy loss in each pulse), because more energy will be directed into the integration window in a shorter time. Conversely, when the channel conditions are degraded (i.e., high propagation loss or large delay spread), then the spacing between the pulses may be increased to direct enough energy into the integration window.

Figure 1:
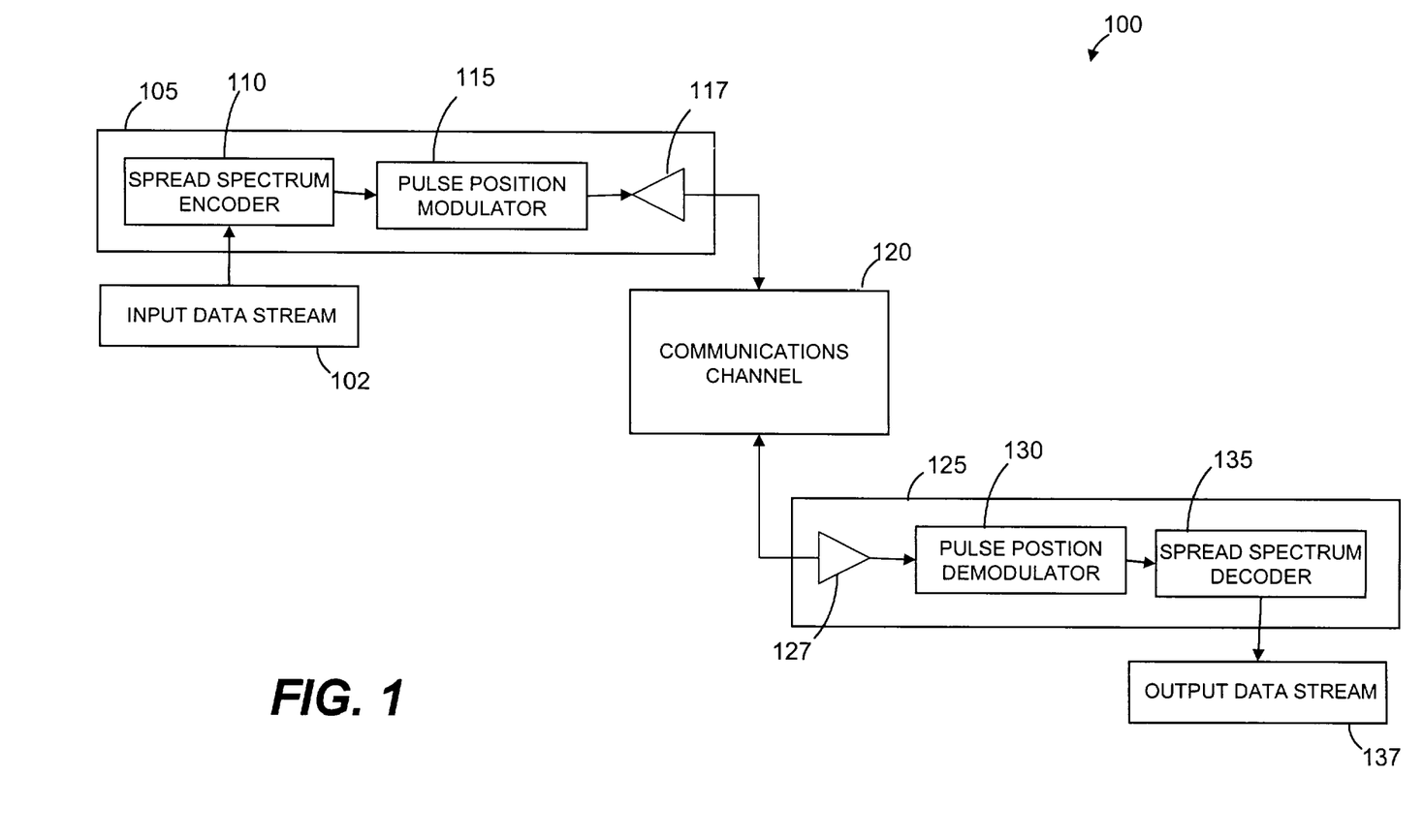
FIG. 1 is a block diagram of an exemplary ultra-wideband communications system.

Turning now to the figures, in which like numerals refer to like elements through the several figures, FIG. 1 illustrates a schematic block diagram of an exemplary UWB communications system 100 employing pulse position modulation scheme. A stream of input data bits is fed to a spread spectrum encoder 110 in a UWB transmitter 105. The spread spectrum encoder 110 encodes each bit of the input data stream using a predefined symbol consisting of $N_c$ "chips" or signal elements. Each chip is transmitted during the symbol period, $T_s$. Each bit of the input data stream is encoded using a predefined spreading code sequence defined as $c=\{c_1, c_2 \ldots c_{Nc}\}$ where $c_1, c_2 \ldots c_{Nc}$ are the spreading code elements. In the exemplary embodiment of the invention, the values that the predefined code sequence may have are $c_i=\{-1, +1\}$, where i=1, 2, 3 . . . $N_c$. Therefore, each symbol will contain a series of $N_c$ encoded pulses. Each spreading code element is associated with each chip within the symbol. The value of the encoded pulses is determined by multiplying the value of the bit by the code value associated with each chip. The spread spectrum encoder 110 then passes the encoded bits to a pulse position modulator 115. The pulse position modulator 115 shifts the position of the pulse within each chip depending on the value encoded on the pulse. The modulated signal is then transmitted through a UWB antenna 117 over a communications channel 120 to a UWB receiver 125. Typically, the communications channel 120 may be a wireless communications channel, although those skilled in the art will appreciate that any communications channel that supports UWB communications, such as a fiber optic communications channel may be used.

The UWB receiver 125 receives the modulated signal through a UWB antenna 127, where it is passed through a pulse position demodulator 130. The pulse position demodulator 130 extracts the spread spectrum signal and passes it to a spread spectrum decoder 135, which generates an output data stream 137 consisting of individual bits of information.

Figure 2:
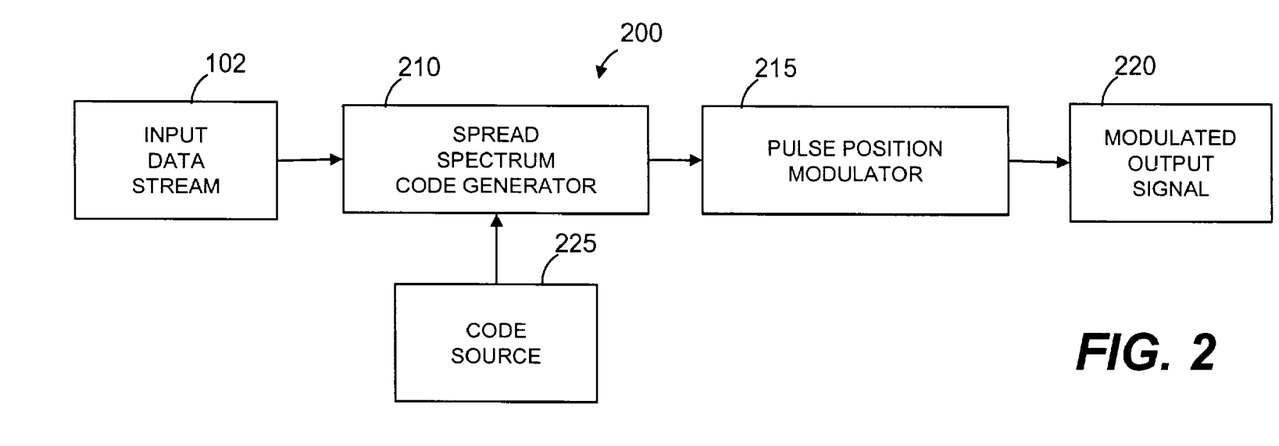
FIG. 2 is a block diagram illustrating an exemplary spread spectrum pulse position modulated communications transmitter in accordance with the invention.

FIG. 2 illustrates a schematic block diagram of an exemplary spread spectrum pulse position modulated UWB transmitter 105 that may be used in accordance with the present invention. An input data stream 102 that contains the bits to be sent by the transmitter 105 is input into a spread spectrum code generator 210. A spreading code sequence generator 225 contains a storage device (not shown), such as a random access memory module that is capable of storing multiple spreading code sequences, denoted by $c=\{c_1, c_2 \ldots c_{Nc}\}$. The code source 225 supplies the code sequence to the spread spectrum code generator 210, which encodes the input data stream into a spread spectrum signal. The spread spectrum code generator 210 encodes each data bit from the input data stream into a symbol. Each symbol consists of a series of $N_c$ chips that are transmitted during each symbol period. The spread spectrum code generator 225 multiplies each bit in the input data stream by the value of each element in the spreading code sequence to generate a sequence of encoded pulses. The value of the data bits are either a one (representing a binary "1") or a negative one (representing a binary "0"). Thus, each data bit takes a value $\{-1, +1\}$. Similarly, the value of each code element $c_i$ in the spreading code takes a value $\{-1, +1\}$. Therefore, the product of the data bit and the spreading code sequence takes the value $\{-1, +1\}$. Thus, the encoded value of the pulse in each chip of the symbol takes the value $\{-1, +1\}$.

The spread spectrum encoder 210 then passes the spread spectrum signal to a binary pulse position modulator 215, which varies the position of the pulses within each chip. The number of positions available in each chip, $N_p$, is dependent upon the value encoded on each pulse of the spread spectrum signal. The pulse position modulator 215 extracts the encoded value of each pulse and shifts the pulse within each chip to one of two positions depending on the encoded value. If the encoded value of the pulse is −1, the pulse position modulator 215 shifts pulse to a first position in the chip. If, however, the encoded value of the pulse is +1, the pulse position modulator 215 shifts the pulse to a second position within the chip. The separation between the first and second positions is constant within each chip and is known as the time shift, $\tau_p$, of the binary pulse position modulator 215. The time shift, $\tau_p$, is set at one-half of the chip period ($\tau_p=T_c/2$) to insure maximum separation between a pulse representing the value −1 and a pulse representing the value +1. The binary pulse position modulator 215 sends the binary pulse position modulated spread spectrum signal to an ultra wideband antenna 220, which transmits the signal over an ultra-wideband communications channel.

Figure 3:
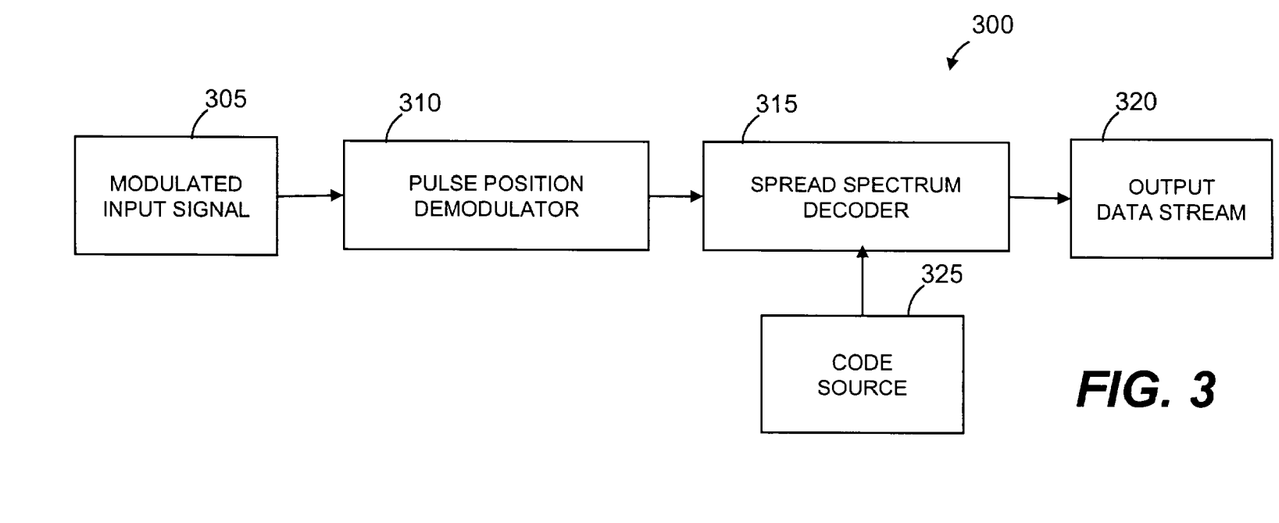
FIG. 3 is a block diagram illustrating an exemplary spread spectrum pulse position modulated communications receiver in accordance with the invention.

FIG. 3 is an illustration of a schematic block diagram of an exemplary spread spectrum pulse position modulated UWB receiver 125 that may be used in accordance with the present invention. A modulated spread spectrum signal received over a communications channel 120 (FIG. 1) 305 is passed to a pulse position demodulator 310. The pulse position modulator 310 demodulates the received signal by determining the position of the pulses within each chip. In the exemplary embodiment, each pulse may be in either a first position or a second position within each chip. The position of the pulse within each chip determines the encoded value of the pulse. For example, in the exemplary embodiment, a pulse located in the first position may indicate that the pulse has a value of −1, whereas a pulse located in the second position may indicate that the pulse has a value of +1. In the exemplary embodiment, the process of determining the position of the pulse within each chip is a "soft decision" in which, the pulse position demodulator 310 calculates a multi-level value of the likelihood that the pulse is located in either the first position or the second position. Alternatively, the pulse position modulator 310 use a "hard decision" process for determining the position of the pulse within each chip. In the hard decision process, the pulse is determined to be located in either the first position or in the second position in the chip. In essence, the hard decision process is a special case of the soft decision process in which the multi-level value is set at one hundred percent. Both the soft decision process and the hard decision process are well known in the art and therefore, are beyond the scope of the present application.

The demodulated signal and the multi-level value are then passed to a spread spectrum decoder 315. The spread spectrum decoder 315 also receives a spreading code sequence from a code generator 325. The spreading code sequence is identical to the spreading code sequence used by the spread spectrum encoder 210 in the transmitter 105 to generate the spread spectrum signal. The spreading code sequence is synchronized with the demodulated signal so that the code values of the spreading code sequence match up with the appropriate chips in each symbol in the demodulated signal. The code values and a multi-level values are then used by the spread spectrum decoder 315 to extract the original bit from each symbol and generate the output data stream 320.

Figure 4:
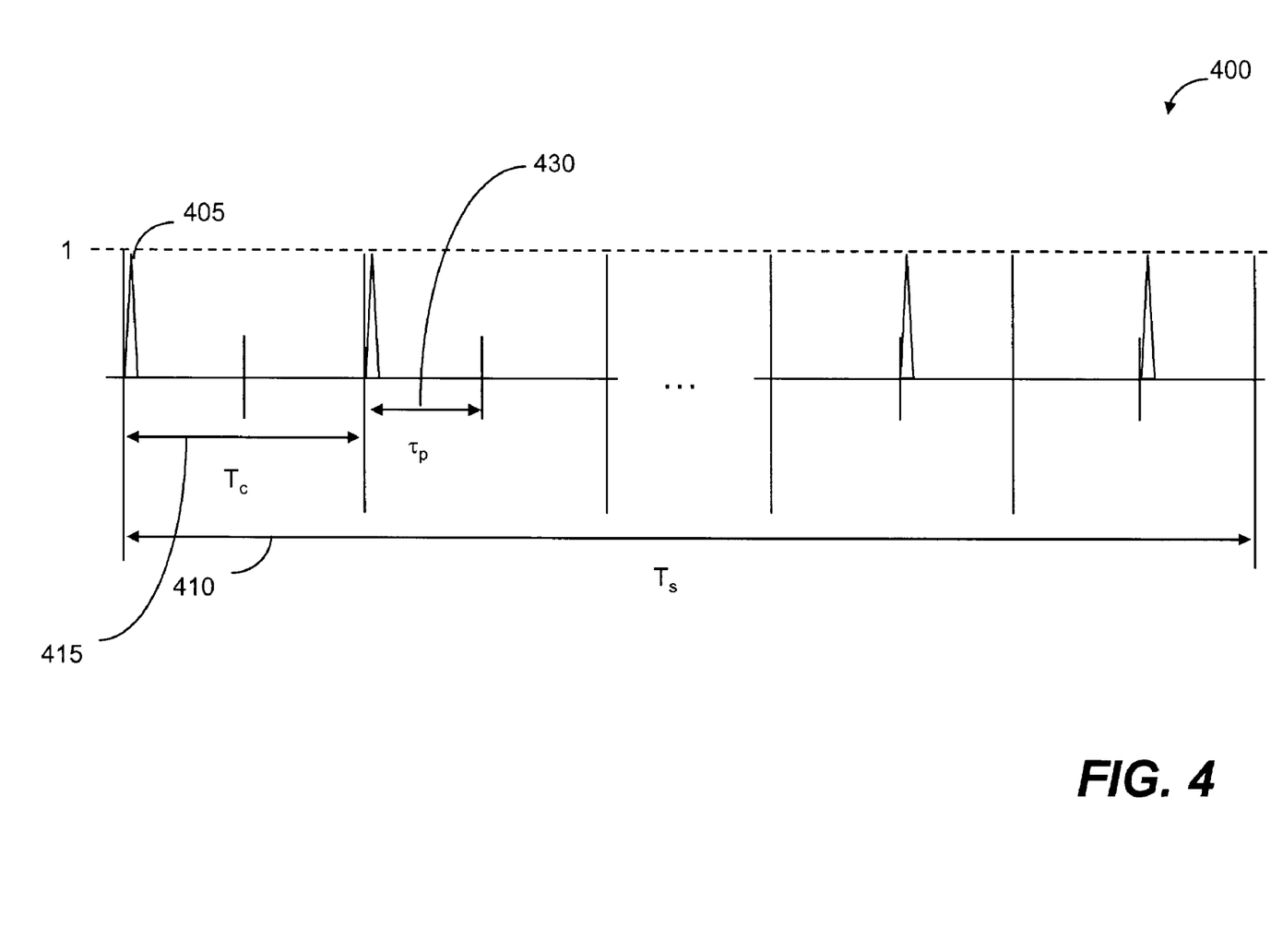
FIG. 4 is an illustration of a spread spectrum signal modulated using pulse position modulated with a coding sequence of c={−1, −1 ... +1, +1} in accordance with the invention.

FIG. 4 is an illustration of an exemplary binary pulse position modulated code division multiple access (PPM-CDMA) signal 400 with code sequence of $c=\{-1, -1, \ldots, +1, +1\}$ in accordance with the invention. The PPM-CDMA signal 400 consists of a series of pulses 405, transmitted during a symbol period $T_s$ 410. The symbol period 410 consists of $N_c$ chips 415, each having a chip period $T_c$. Each chip 415 contains a single pulse 405 with amplitude equal to +1. The pulse 405 within each chip is shifted from the beginning of the chip 415 by an amount equal to $\Delta_p$ if the amplitude of the pulse 405 is equal to −1 or $\Delta_p+\tau_p$ if the amplitude of the pulse 405 is equal to +1, where $\tau_p$ is the PPM modulator time shift 430. In FIG. 3, $\Delta_p$ is set to zero and $\tau_p$ is set to $T_c/2$. The latter setting ensures that the time shift 330 of the PPM modulator 215 (FIG. 2) provides the maximum separation between the +1 and −1 PPM modulated signals and allows adequate pulse discrimination at the receiver. The exemplary signal can be represented by equation (1) above.

Figure 5:
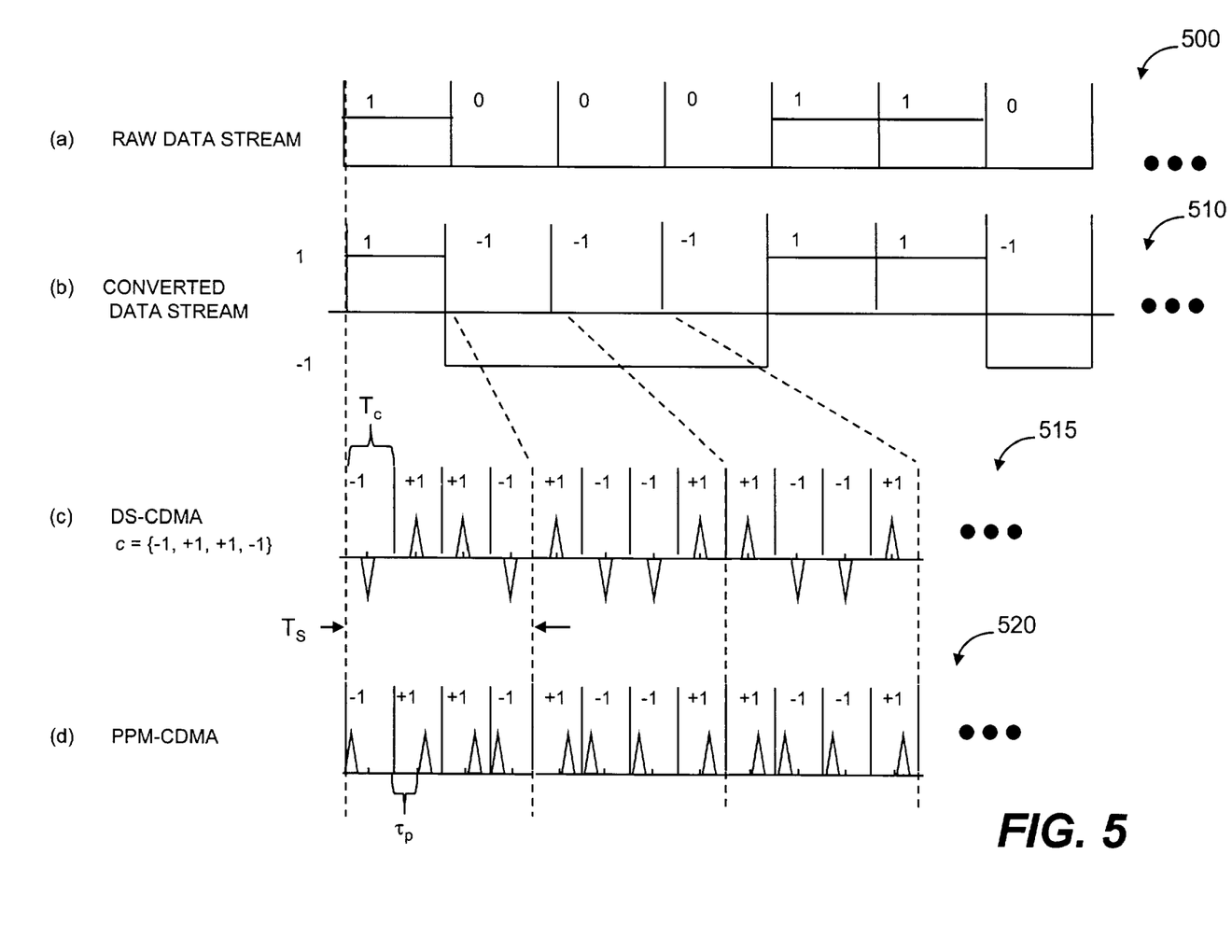
FIG. 5 is an exemplary illustration of a binary PPM-CDMA signal with a coding sequence of c={−1, +1, +1, −1}.

FIG. 5 is an illustration of a binary pulse position modulated CDMA signal using a code sequence of c={−1, +1, +1, −1}. FIG. 5(a) illustrates an input data stream 500 consisting of stream of binary bits {1, 0, 0, 0, 1, 1, 0 . . . }. However, the value "0" is difficult to detect. Therefore, the bits that are equal to binary "0" are converted so that they have negative amplitude. FIG. 5(b) illustrates a converted signal 510 of the data stream 500, which has been converted so that the binary "0" bits are represented as negative amplitude.

FIG. 5(c) is an illustration of signal 510 encoded as a conventional direct sequence spread spectrum signal 515 using the spreading code sequence c={−1, +1, +1, −1}. Each bit is encoded as a symbol, which is divided into four chips. Each chip contains a pulse, whose value is the product of the data bit and the value of the code elements. In the illustration, the first data bit, which is a binary "1," has the encoded values {−1, +1, +1, −1}. The second data bit, which is a binary "0," is encoded as {+1, −1, −1, +1}. The resultant spread spectrum signal is antipodal. That is, the amplitudes of the pulses vary between a positive value and a negative value.

FIG. 5(d) illustrates an exemplary pulse position modulated signal 520 of the data stream 510. Each data bit of the converted signal 510 is encoded into a symbol consisting of $N_c$ chips. In the illustration, each symbol contains four chips. However, those skilled in the art will appreciate that the number of chips can be any integer value. Each chip has two positions, a first position and a second position separated by a distance, $\tau_p$, known as the PPM modulator time shift. A pulse is placed in either the first position or the second position depending on the value encoded on the pulse. The pulse is shifted to the first position if the encoded value is −1. The pulse is shifted to the second position if however, the encoded value of the pulse is +1. Separating the first and second positions by $\tau_p=T_c/2$ provides the maximum separation between the −1 and +1 encoded pulses.

Figure 6:
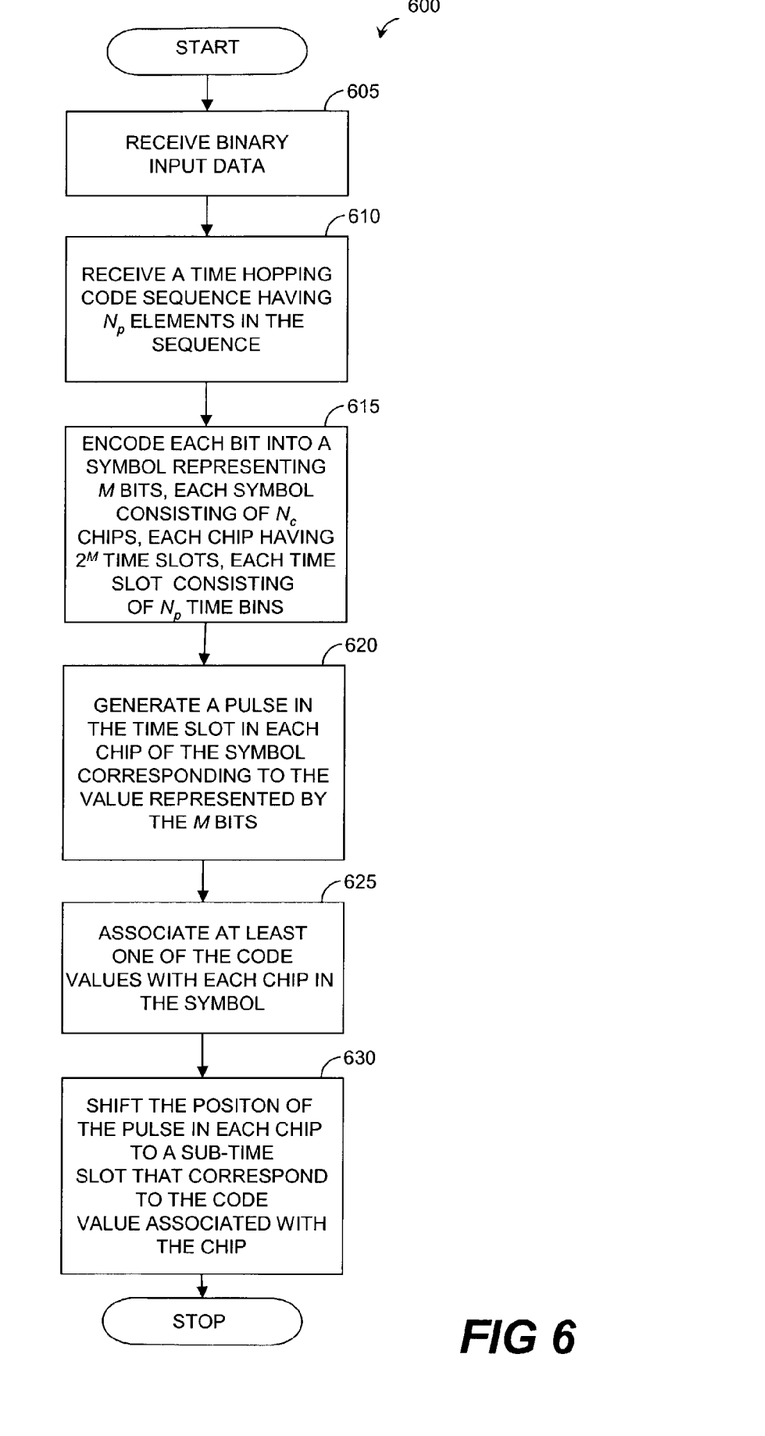
FIG. 6 is a logic flow diagram illustrating an exemplary method for modulating a spread spectrum using pulse position modulation.

FIG. 6 is a logic flow diagram of a routine 600 for generating a binary PPM spread spectrum signal in an UWB transmitter 210 (FIG. 2) in accordance with the invention. Routine 600 begins at 605, in which an input data stream 205 consisting of a stream of binary bits, is received by a UWB transmitter 210. At 610, the transmitter 210 receives at least one spreading code sequence. At 615, each bit of data is encoded into a symbol. Each symbol consists of a number of predefined chips, $N_c$, which are transmitted during the symbol period $T_s$. The number of chips, $N_c$ is equal to the number of code element in the each of the spreading code sequences. This allows each code element to be associated with at least one chip in each symbol at 620. Next, at 625, an encoded pulse is generated in each chip in the symbol. Each pulse has an encoded value that is determined by taking the product of the data bit and the code value of the code element associated with that particular chip. For example, the data bits can take the values {−1, +1 }. The value of the individual code elements can also take the values {−1, +1}. Therefore, the encoded value will also take the value {−1, +1}. Thus, for a data bit having the value −1 (representing a binary "0") and a spreading code sequence of {−1, +1. +1, −1}, the pulses in each chip in the symbol will have the encoded values given by −1×{−1, +1. +1, −1}={+1, −1, −1, +1}.

At 630, each pulse is modulated within each chip using pulse position modulation. In the exemplary embodiment, the pulse in each chip is modulated using binary pulse position modulation to shift the position of the pulse between a first position and a second position depending on the value of encoded on the pulse. Thus, if the encoded value of the pulse is −1, the transmitter 210 shifts the pulse to the first position in the chip. If however, the encoded value of the pulse is +1, the transmitter 210 shifts the pulse to the second position in the chip. Separating the first and second positions by $\tau_p=T_c/2$ provides the maximum separation between the −1 and +1 encoded pulses. This insures maximum separation between the signal represented by −1 and the signal represented by +1 to minimize inter-chip collisions.

Other alternative embodiments will become apparent to those skilled in the art to which an exemplary embodiment pertains without departing from its spirit and scope. Accordingly, the scope of the present invention is defined by the appended claims rather than the foregoing description.

We claim:

1. A method of modulating a communications signal within an ultra-wideband (UWB) communications system, comprising:
    receiving a plurality of bits in an input data stream;
    receiving at least one spreading code sequence comprising a plurality of code elements having either a first value or a second value;
    encoding each bit of the stream of input data bits into a symbol having a finite symbol period, and comprising a plurality of chips, wherein each chip has a chip period;
    associating at least one code element with each chip in the symbol;
    generating an encoded pulse for each chip of the symbol, wherein each encoded pulse has a value equal to the product of a bit and the code value associated with the particular chip; and
    modulating the position of the encoded pulse within each chip by placing the pulse at a first position if the encoded value associated with the pulse is a first value and placing the pulse at a second position if the encoded value is a second value, wherein the first position and second position are separated by a time shift equal to one-half of a chip period, the period being greater than a delay spread associated with the Ultra wideband (UWB) communications system.

2. The method of claim 1, wherein the spreading code sequence is an orthogonal code sequence.

3. The method of claim 1, wherein the spreading code sequence is a pseudorandom code sequence.

4. The method of claim 3, wherein the time shift is a predefined time shift other than one-half a chip period.

5. A transmitter for transmitting a pulse position modulated spread spectrum signal in a communications system, comprising:
    a spreading code sequence generator for generating at least one spreading code sequence, each spreading code sequence comprising a plurality of elements having either a first value or a second value;

a spread spectrum encoder, operable for:
  receiving a stream of input data bits;
  receiving at least one spreading code sequence from the spreading code generator; and
  encoding each bit of the stream of input data bits into a symbol having a finite symbol period, and comprising a plurality of chips, wherein each chip comprises a chip period;
  associating at least one code element with each chip in the symbol; and
  generating an encoded pulse in each chip of the symbol, wherein the encoded pulse has a value equal to the product of the bit and the code value associated with the particular chip;

a pulse position modulator operable for modulating each pulse by shifting the position of the pulse within each chip by placing the pulse at a first position if the encoded value associated with the pulse is a first value amd placing the pulse at a second position if the encoded value is a second value, wherein the first position and second position are separated by a time shift eciual to one-half of a chip period, the period being greater than a delay spread associated with an Ultra wideband (UWB) communications system; and an antenna for transmitting the pulse position modulated signal over an ultra-wideband communications channel.

6. The transmitter of claim 5, wherein the spreading code sequence is an orthogonal code sequence.

7. The transmitter of claim 5, wherein the spreading code sequence is a pseudorandom code sequence.

8. The transmitter of claim 5, wherein the time shift is a predefined time shift other than one-half a chip period.

9. A receiver for receiving a pulse position spread spectrum signal in an ultra-wideband (UWB) communications system, the pulse position modulated spread spectrum signal comprising a plurality of symbols, each symbol representing one data bit and consisting of a plurality of chips, each chip having a chip period and each chip period containing an encoded pulse, comprising:
  a demodulator operable to demodulate the symbols in the pulse position modulated spread spectrum signal by detecting the position of the encoded pulse within each chip period to determine whether the encoded pulse is located at a first position or a second position, wherein the first position and second position are separated by a time shift eQual to one-half of the chip period, the period being greater than a delay spread associated with the ultra wideband (UWB) communications system; and
  a spread spectrum decoder operable for: receiving at least one spreading code sequence; and decoding each symbol by combining the appropriate code value of the spreading code sequence with a value associated with the position of the encoded pulse in each chip of the symbol to extract the data bit.

10. The receiver of claim 9, wherein the spreading code sequence is an orthogonal code sequence.

11. The receiver of claim 9, wherein the spreading code sequence is a pseudorandom code sequence.

12. The receiver of claim 9, wherein detecting the position of the encoded pulse within each chip period comprises determining a multi-level value of the likelihood that the pulse is located in either the first position or the second position within each chip period.

13. The receiver of claim 12, wherein the time shift is a predetermined time shift other than one-half a chip period.

14. A method of receiving a pulse position modulated spread spectrum signal, the pulse position modulated spread spectrum signal comprising a plurality of symbols, each symbol representing one data bit and consisting of a plurality of chips, each chip having a chip period and each chip containing an encoded pulse, comprising:
  demodulating the pulse position modulated spread spectrum signal by detecting the position of the encoded pulse within each chip period to determine whether the pulse is located at a first position or a second position, wherein the first position and second position are separated by a time shift equal to one-half of the chip period, the period being greater than a delay spread associated with the ultra wideband (UWB) communications system;
  receiving at least one spreading code sequence; and
  decoding each symbol by combining the appropriate code value of the spreading code sequence with a value associated with the position of the encoded pulse in each chip of the symbol to extract the data bit.

15. The method of claim 14, wherein detecting the position of the pulse within each chip comprises determining a multi-level value of the likelihood that the pulse is located in either a first position or a second position within each chip period.

16. The method of claim 14, wherein the time shift is a predetermined time shift.

* * * * *